(12) United States Patent
Evers

(10) Patent No.: US 9,869,364 B2
(45) Date of Patent: Jan. 16, 2018

(54) VIBRATION ISOLATOR WITH PNEUMATIC SPRING

(71) Applicant: Integrated Dynamics Engineering GmbH, Raunheim (DE)

(72) Inventor: Arndt Evers, Oestrich-Winkel (DE)

(73) Assignee: Integrated Dynamics Engineering GmbH, Raunheim (DE)

( * ) Notice: Subject to any disclaimer, the term of this patent is extended or adjusted under 35 U.S.C. 154(b) by 0 days.

(21) Appl. No.: 14/829,880

(22) Filed: Aug. 19, 2015

(65) Prior Publication Data

US 2016/0084339 A1 Mar. 24, 2016

(30) Foreign Application Priority Data

Sep. 18, 2014 (EP) ..................... 14185342

(51) Int. Cl.
| F16F 1/18 | (2006.01) |
| F16F 15/023 | (2006.01) |
| F16F 13/00 | (2006.01) |
| F16F 15/027 | (2006.01) |
| F16F 15/04 | (2006.01) |
| F16M 1/00 | (2006.01) |

(52) U.S. Cl.
CPC ........ *F16F 15/0232* (2013.01); *F16F 13/002* (2013.01); *F16F 15/0275* (2013.01); *F16F 15/046* (2013.01)

(58) Field of Classification Search
CPC ........ F16F 3/00; F16F 7/00; F16F 9/00; F16F 9/3207; F16F 13/00; F16F 13/002; F16F 15/04; F16F 15/046; F16F 15/0232; F16F 15/0275

USPC ........ 267/136, 140.14, 140.15; 248/550, 578
See application file for complete search history.

(56) References Cited

U.S. PATENT DOCUMENTS

| 4,549,470 A | * | 10/1985 | Yogo | F02B 37/186 384/215 |
| 5,779,010 A | | 7/1998 | Nelson | |
| 5,883,447 A | * | 3/1999 | Clausin | F16F 7/1011 267/140.14 |
| 5,975,972 A | * | 11/1999 | Wilmsen | F16F 1/422 248/562 |
| 6,926,263 B1 | | 8/2005 | Nelson | |
| 2005/0161870 A1 | * | 7/2005 | Hayashi | F16F 15/0232 267/64.27 |
| 2005/0218734 A1 | * | 10/2005 | Tahara | F16F 13/268 310/90 |
| 2007/0001354 A1 | * | 1/2007 | Stothers | B64C 1/066 267/136 |

FOREIGN PATENT DOCUMENTS

| DE | 69817750 T2 | 7/2004 |
| WO | 9905573 A1 | 2/1999 |

OTHER PUBLICATIONS

"Search Report issued in parent European Application No. EP 14 18 5342", dated Mar. 30, 2015, Publisher: EPO, Published in: EP.

* cited by examiner

*Primary Examiner* — Melody M Burch
(74) *Attorney, Agent, or Firm* — Kaplan Breyer Schwarz, LLP

(57) ABSTRACT

The invention relates to a vibration isolator with a pneumatic spring. The vibration isolator comprises a leaf spring assembly for vertical isolation and a flexible rod or a buckling pendulum for horizontal isolation.

10 Claims, 6 Drawing Sheets

VIBRATION ISOLATOR WITH PNEUMATIC SPRING

CROSS-REFERENCE TO RELATED APPLICATION

European Patent Application No. 14185342.4, with a filing date of Sep. 18, 2014, is incorporated herein by reference.

FIELD OF THE INVENTION

The invention relates to a vibration isolator with a pneumatic spring. More particularly the invention relates to a vibration isolator which is used in a stationary vibration isolation system for supporting equipment in the semiconductor industry, for example lithography equipment, optical inspection equipment, and wafer handling equipment.

BACKGROUND OF THE INVENTION

Such vibration isolation systems are known. For example, patent document DE 698 177 50 T2 discloses a vibration isolation system which is used for vibration-isolated mounting of a lithography device.

There, pneumatic springs can be driven via a servo valve and be integrated into the control loop of an active vibration isolation system.

A mass to be isolated is supported on three or more vibration isolators. Vibration isolation from the ground is achieved already above the natural frequency of the spring-mass system by using isolators having a pneumatic spring.

In addition to an active vibration isolation by the pneumatic springs themselves, there are also non-contact actuators such as magnetic actuators, which enable an active vibration isolation, in particular by contributing to a vibration isolation at a higher frequency range.

Additionally, pneumatic springs are used for level adjustment of the system in that case. Therefore, a change in the weight resting on the vibration isolation system leads to a change of the required air pressure, which is only possible within limits and which in many cases leads to an undesired change in the natural frequency.

When using a pneumatic spring, it is problematic to provide a vibration isolation system that allows for level compensation and for which at the same time the vertical and horizontal rigidity is so high that even a natural frequency of more than 5 Hz can be realized in order to achieve short control settling times. In known systems this is not possible or only possible with great effort.

OBJECT OF THE INVENTION

Therefore, the invention is based on the object to mitigate the drawbacks of a pneumatic vibration isolator mentioned above.

In particular, a simply constructed vibration isolator is to be provided which allows for level compensation by a pneumatic spring, and in which at the same time a comparatively high natural frequency, in particular a natural frequency of more than 5 Hz can be achieved both in the horizontal and vertical directions.

SUMMARY OF THE INVENTION

The object of the invention is achieved by a vibration isolator in accordance with the illustrative embodiment of present invention.

The invention relates to a vibration isolator which is in particular intended for use in a stationary vibration isolation system which in particular serves for vibration-isolated mounting of equipment in the semiconductor industry.

The vibration isolator comprises a pneumatic spring. The pneumatic spring usually comprises a piston supported in a working space by fluid pressure. In particular, the invention relates to a pneumatic spring configured as a closed system, in which the working space is defined by a membrane.

The pneumatic spring is connected to a head part by a flexible rod or a buckling pendulum.

In particular, the piston of the spring is connected to an upper part of the isolator. However, a reverse arrangement is also conceivable.

The flexible rod or the buckling pendulum essentially determine the horizontal rigidity of the system, that is the rigidity in horizontal direction in the installed state.

In the simplest case, this may be a flexible rod with an unchanging diameter that bends sideways when subjected to a horizontal load.

The use of buckling pendulums or of combinations thereof is also conceivable.

In particular it is conceivable to provide weakened zones in sections of the flexible rod, which may be regarded as a hinge, so that a combination of flexible rod and buckling pendulum would be achieved in this case.

The flexible rod or the buckling pendulum in turn is coupled to the base part via at least one leaf spring that is effective in a vertical direction.

The at least one leaf spring determines the rigidity of the isolator in vertical direction.

The use of leaf spring and buckling pendulum allows for a particularly easy adjustment of the isolator, for example by exchanging the flexible rod or the leaf spring.

In addition, the horizontal rigidity can be set independently of the vertical rigidity.

The use of leaf springs moreover has the advantage that leaf springs can be manufactured precisely and that the calculated rigidity largely correlates with the actual rigidity.

In one refinement of the invention, the pneumatic spring comprises a piston having an extension. The flexible rod or the buckling pendulum is arranged in the extension, at least sections thereof.

In particular, the extension is provided in form of a central recess of the piston, which protrudes into the working space of the piston.

The working space of the piston now serves to accommodate the flexible rod or the buckling pendulum. This has a favorable effect on the natural frequency, reduces prolongation of vibrations and enables a more compact configuration.

In particular, the extension protrudes into the working space over at least half the height of the working space.

In a preferred embodiment of the invention, the leaf spring is part of a leaf spring assembly.

In this case, a very simple adjustment of the vibration isolator is possible by replacing or omitting individual leaf springs. The leaf springs are preferably spaced apart by spacer rings.

In a preferred embodiment, particularly for the leaf spring assembly, a leaf spring is used which comprises a plurality of spring segments connected in parallel.

In particular, it is contemplated to use a leaf spring which comprises an outer part and an inner part which are connected by a plurality of arms, preferably at least three, which form the actual leaf springs.

The leaf spring may in particular have an inner ring connected to the piston or the extension of the piston, and an outer ring connected to the base part.

It will be understood that the inner ring and/or the outer ring may likewise have a polygonal shape instead of an annular segment shape.

The invention enables to provide a vibration isolator which has a natural frequency of more than 5 Hertz in vertical and/or horizontal direction when installed.

For adjusting rigidity, the flexible rod and/or the leaf spring are preferably exchangeable.

It is in particular contemplated to provide a leaf spring assembly accessible from one direction, in which the individual leaf springs may be removed and replaced by other springs or by spacer rings.

The invention in particular relates to a vibration isolator that is used in conjunction with a vibration isolation system which includes an active control.

In this case, at least one sensor is provided which detects vibrations or the position of the load to be isolated or of the floor on which the vibration isolation system is resting.

The fluid pressure in the pneumatic spring of the vibration isolator is controlled via a servo valve and a control device connected to the at least one sensor.

In this manner, the vibration isolator may provide for level compensation by detecting the vertical position of the load to be isolated and controlling the fluid pressure in the pneumatic spring based on a comparison of the actual position and a desired position.

It is also conceivable to integrate non-contact force actuators in the vibration isolation system, in particular in the vibration isolator itself, which in particular serve to isolate higher-frequency vibrations.

BRIEF DESCRIPTION OF THE DRAWINGS

The subject matter of the invention will now be described in more detail with reference to FIGS. 1 to 6.

DETAILED DESCRIPTION

The basic principle of the invention will now be explained with reference to the schematic view of FIG. 1.

Figure 1:
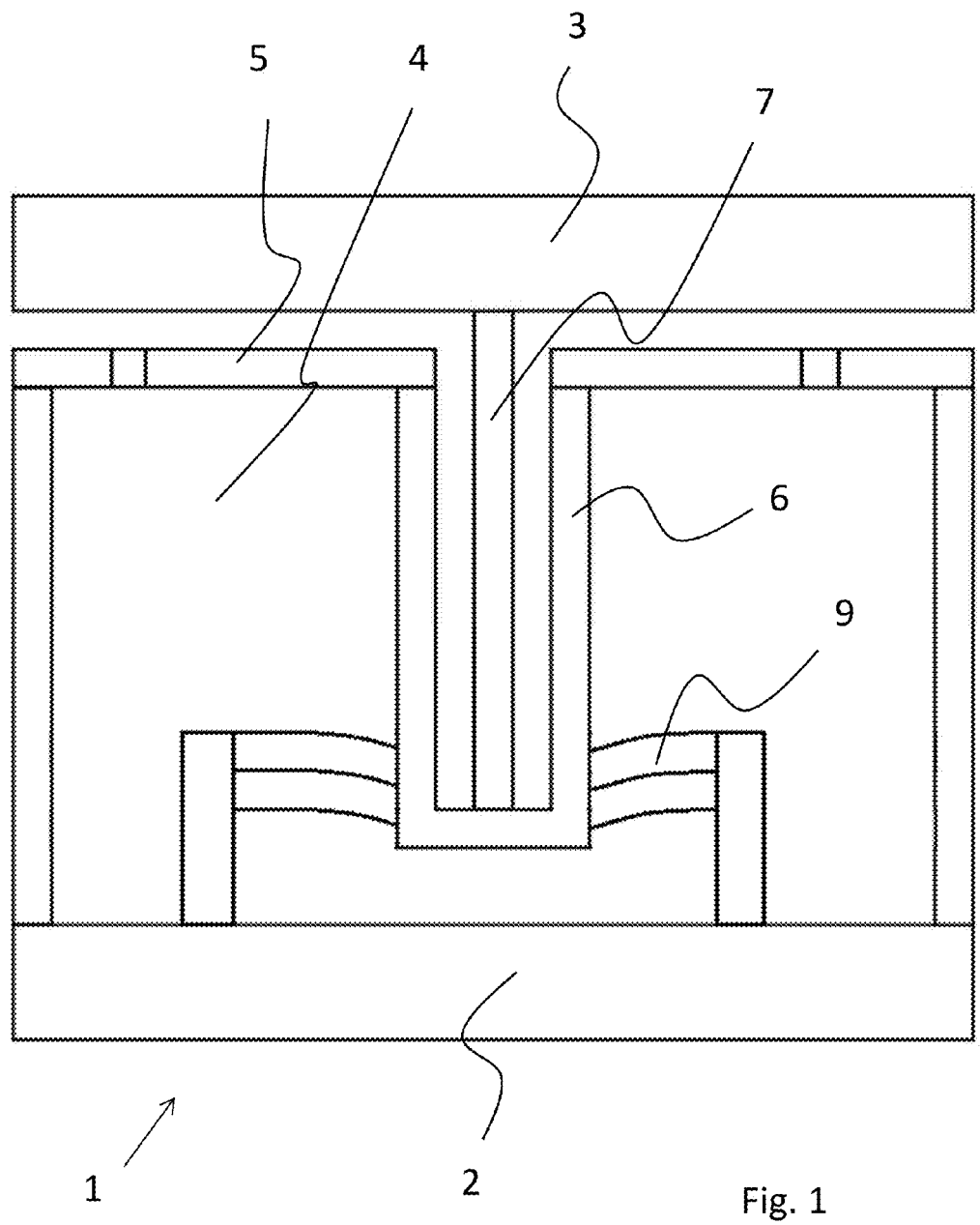
FIG. 1 shows a schematic principle diagram of a vibration isolator.

FIG. 1 shows a sectional view of a vibration isolator 1.

The vibration isolator comprises a base part 2 and a head part 3 which is mounted with vibration isolation relative to base part 2.

Head part 3 may be part of an assembly that forms the vibration isolator 1 which is then incorporated in a vibration isolation system. In this case, head part 3 may for example be secured to a table that is used for anti-vibration mounting of a lithography device.

It is also conceivable that head part 3 is an integral part of the table.

Vibration isolator 1 further comprises a working space 4 in which a fluid pressure exists and which supports a piston 5. Working space 4 is closed by a membrane (not shown) which makes the piston 5 movable relative to the remaining housing of the vibration isolator.

Piston 5 comprises an extension 6 extending in vertical direction. In this exemplary embodiment, extension 6 is screw-connected to the remaining piston. However, a one-piece embodiment is also conceivable.

A flexible rod 7 is attached to the bottom of this extension and is connected to the head part 3.

In this manner, horizontal resilience is provided as the flexible rod 7 bends.

Piston 5, in this exemplary embodiment extension 6 of piston 5, is connected to base part 2 via a leaf spring assembly 9.

Leaf spring assembly 9 provides vibration isolation in vertical direction.

Leaf spring assembly 9 primarily determines the rigidity of the isolator, while the pneumatic spring which is formed by working space 4 and piston 5 primarily serves for level adjustment.

Figure 2:
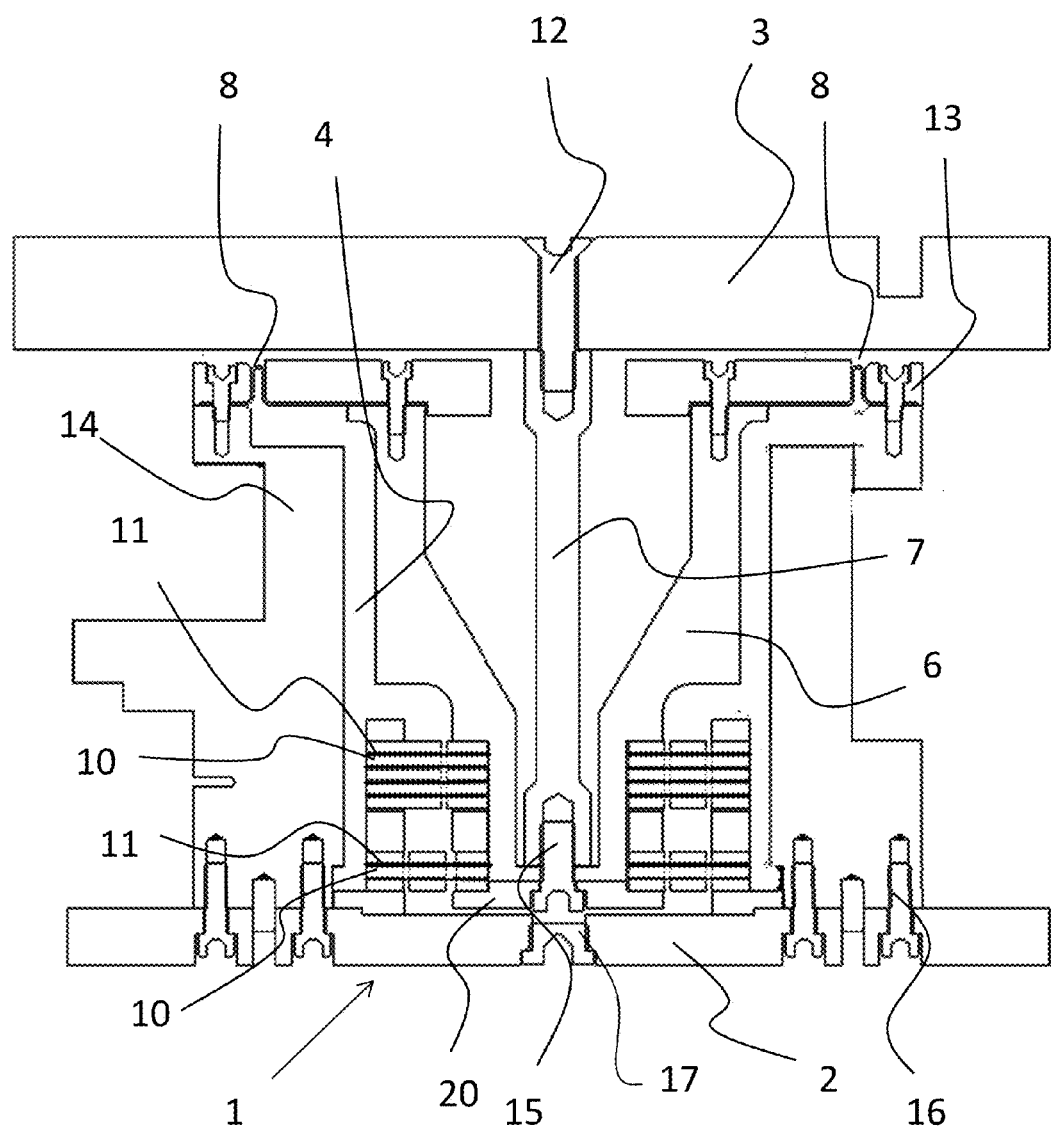
FIG. 2 shows a sectional view of an exemplary embodiment of a vibration isolator.

FIG. 2 shows a sectional view of an exemplary embodiment of a vibration isolator.

The vibration isolator comprises base part 2 and head part 3 coupled thereto with vibration isolation.

It can also be seen here that working space 4 is closed by a membrane 8 arranged below head part 3.

Membrane 8 is connected to the housing 14 of working space 4 by means of a clamping ring 13.

Furthermore, flexible rod 7 can be seen which is connected to head part 3 by screw 12.

Flexible rod 7 is connected to extension 6 at the bottom thereof by means of screw 15. For this purpose, extension 6 includes a bottom part 20.

By loosening the easily accessible screws 12 and 15, the flexible rod may be removed and replaced for adjusting the isolator. Screw 15 is accessible after screw 17 has been removed, which closes working space 4.

Housing 14 of working space 4 is connected to base part 2 by screws 16.

Furthermore, individual springs 10 and spacer rings 11 of the leaf spring assembly can be seen.

The at least one fluid line which supplies working space 4 with fluid is not shown in this view.

Figure 3:
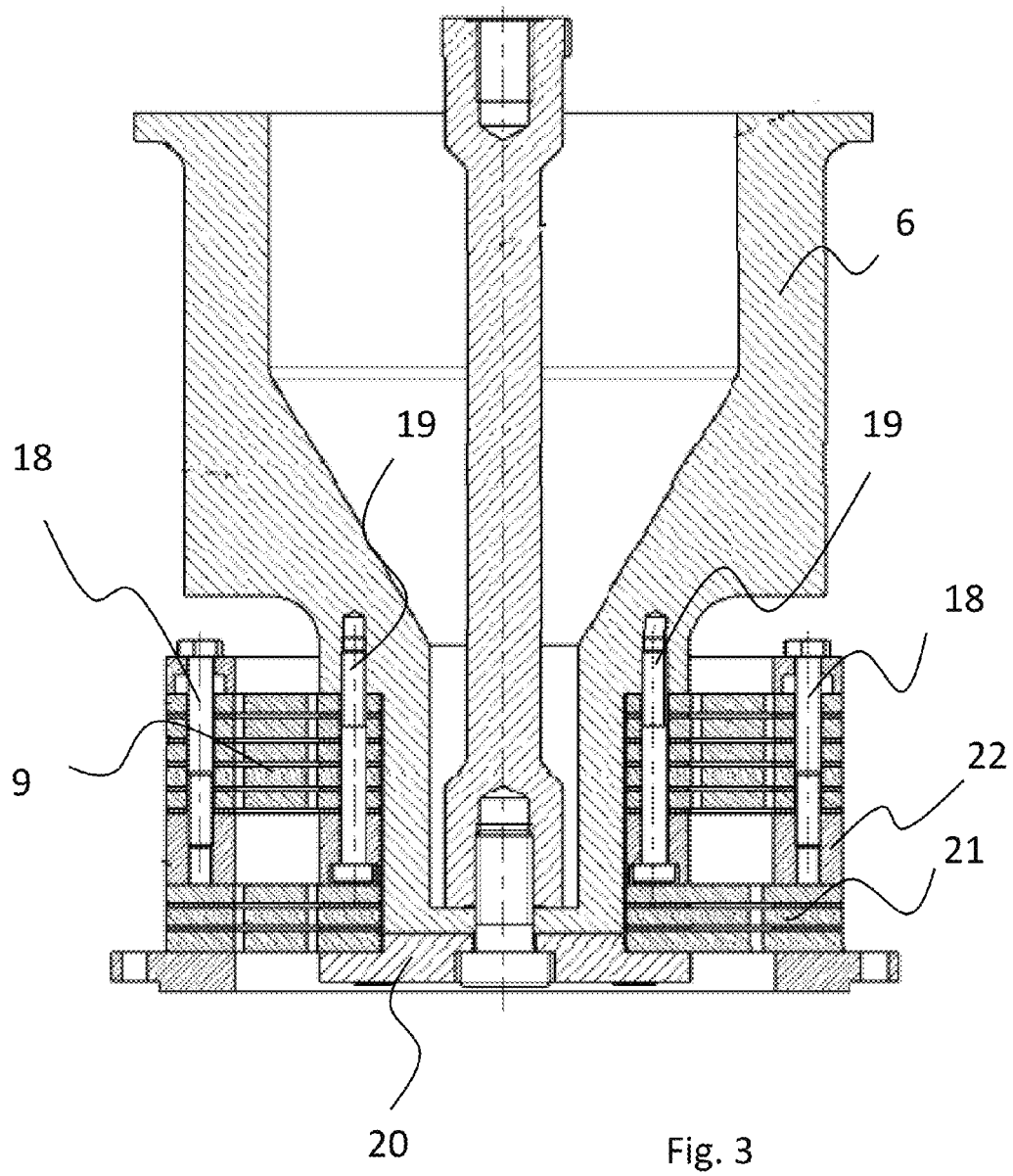
FIG. 3 shows another sectional view of a portion of a vibration isolator.

FIG. 3 shows a detailed view of a portion of a vibration isolator according to the invention, namely extension 6 connected to leaf spring assembly 9.

It can be seen that at least a part of leaf spring assembly 9 is connected to base part 2 by screws 18 and to extension 6 by screws 19.

After loosening the screws, leaf spring assembly 9 consisting of leaf springs and spacers can be removed.

Spaced apart from leaf spring assembly 9, a lower leaf spring assembly 21 is arranged. Lower leaf spring assembly 21 and the bottom part are held by screws which cannot be seen in this sectional view.

Figure 4:
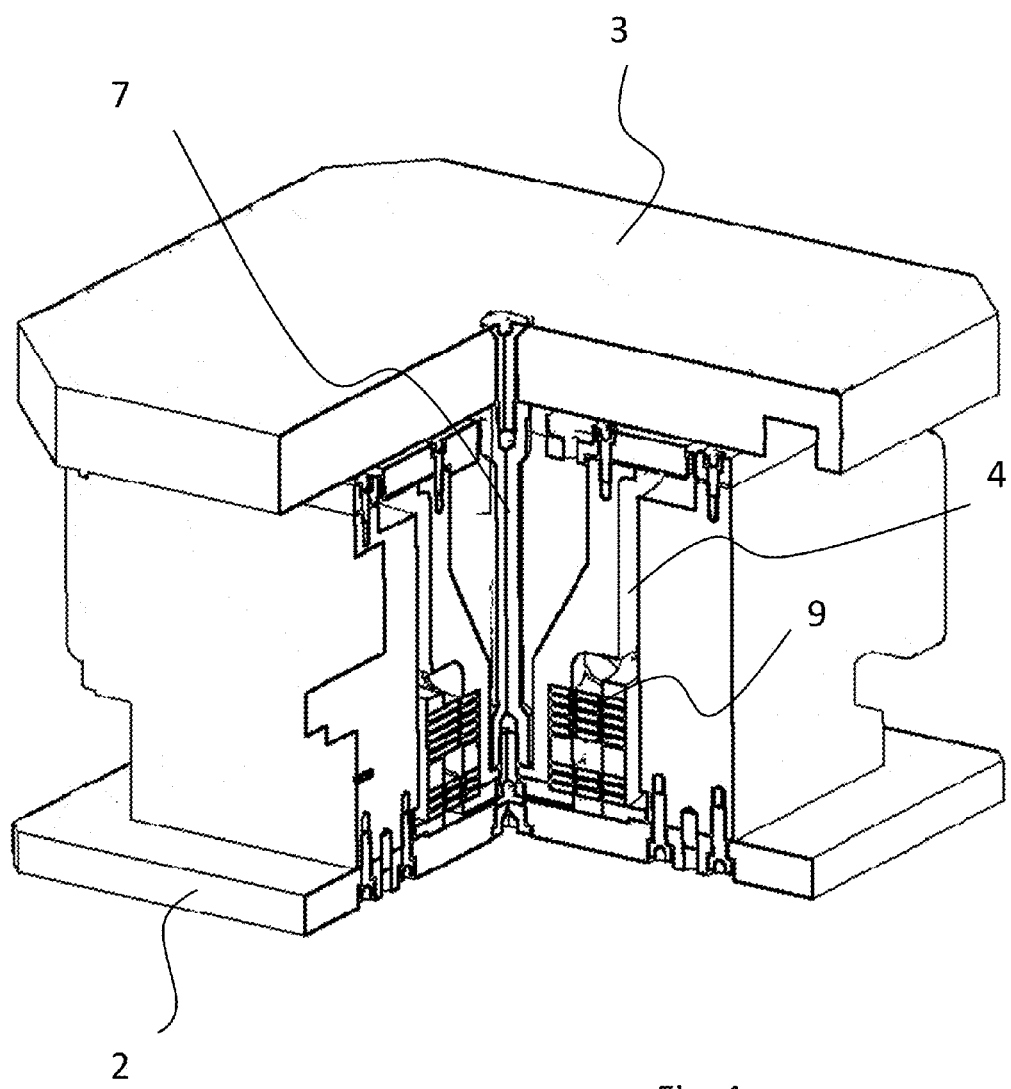
FIG. 4 shows a partially broken away perspective view of an assembly comprising a vibration isolator.

FIG. 4 shows a perspective view partially broken away of an assembly including a vibration isolator according to the invention.

Base part 2 and head part 3 of the vibration isolator can be seen, as well as working space 4 therebetween through which flexible rod 7 extends which is arranged in an extension of the piston. Furthermore, spring assembly 9 can be seen which is effective in vertical direction, whereas flexible rod 7 is effective in horizontal direction.

Figure 5:
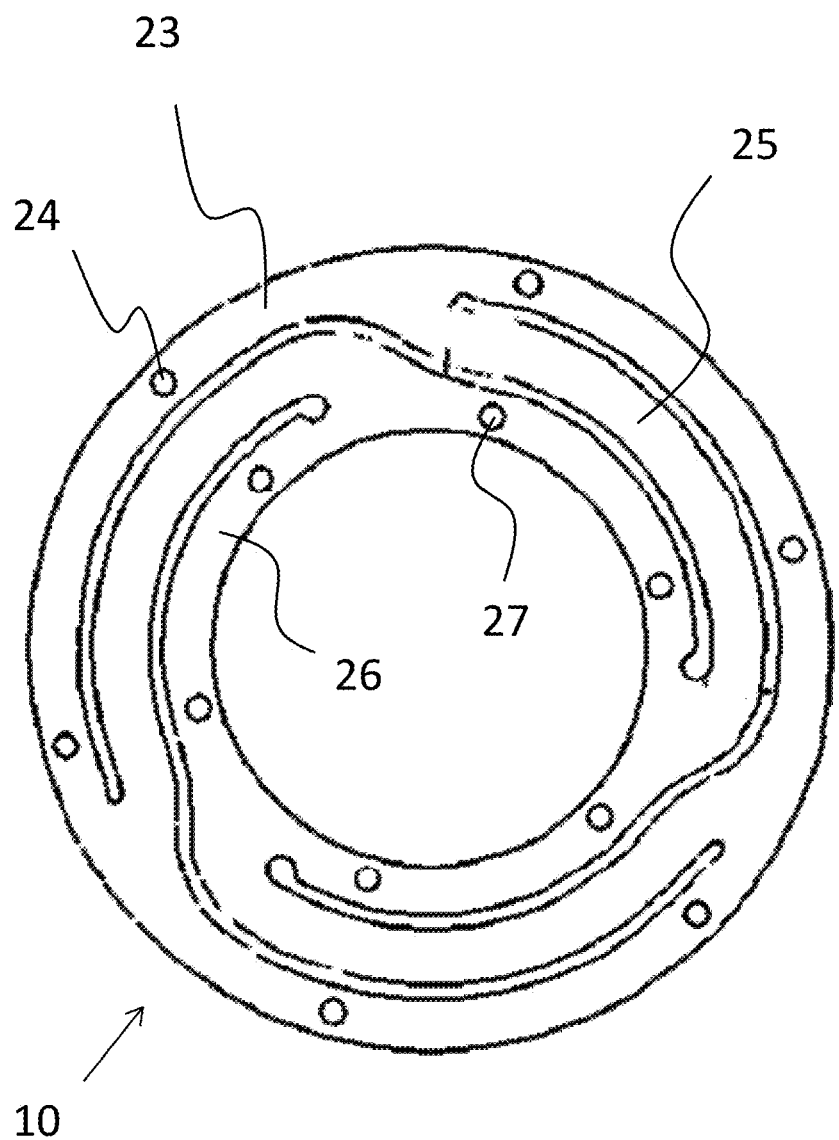
FIG. 5 shows a plan view of a leaf spring that can be used for a vibration isolator according to the invention.

FIG. 5 shows a view of an exemplary leaf spring 10. The leaf spring shown in this exemplary embodiment comprises an inner ring 26 which has holes 27 in order to be fixed to the extension (6 in FIG. 3) of the piston.

An outer ring 23 includes holes 24 in order to be fixed to the base part.

In this embodiment, resiliency in vertical direction is ensured by three spring segments 25 connecting outer ring 23 and inner ring 26 and being connected in parallel.

By exchanging or omitting suchlike leaf springs 10 in the spring assembly, the characteristics of the vibration isolator can be easily adjusted.

Figure 6:
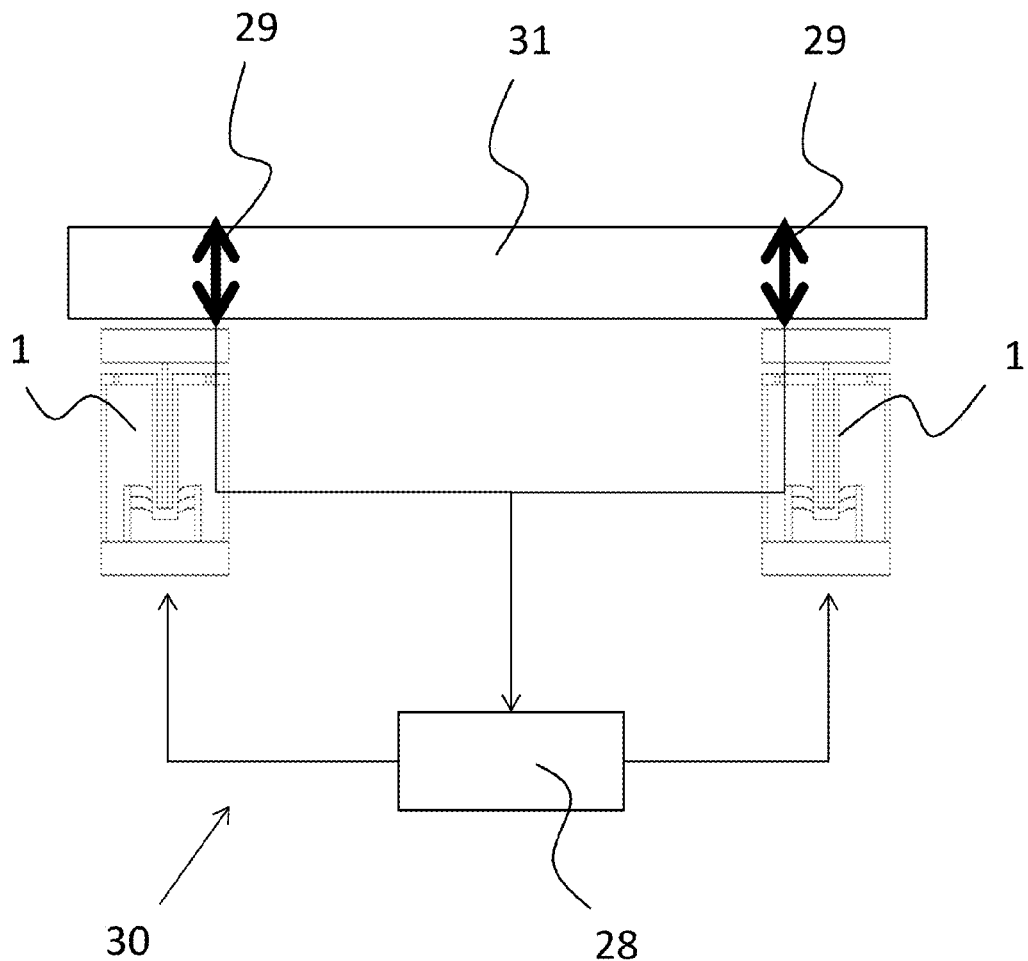
FIG. 6 is a schematic diagram of a vibration isolation system.

FIG. 6 shows a schematic view of a vibration isolation system 30.

This vibration isolation system comprises a table 31 which is supported on at least three vibration isolators 1.

Sensors 29 are used to detect the level of the table at the position of each respective vibration isolator 1.

Based on the signal of sensors 29, control device 28 controls the pressure in vibration isolators 1 and thus provides level compensation.

It will be understood that the vibration isolation system may include additional sensors and/or actuators, in particular non-contact force actuators.

By exchanging leaf springs in the spring assembly and/or the flexible rod, the vibration isolators 1 at the respective position may be adjusted to a same natural frequency in a very simple manner.

| List of Reference Numerals: | |
| --- | --- |
| 1 | Vibration isolator |
| 2 | Base part |
| 3 | Head part |
| 4 | Working space |
| 5 | Piston |
| 6 | Extension |
| 7 | Flexible rod |
| 8 | Membrane |
| 9 | Leaf spring assembly |
| 10 | Leaf spring |
| 11 | Spacer ring |
| 12 | Screw |
| 13 | Clamping ring |
| 14 | Housing |
| 15 | Screw |
| 16 | Screw |
| 17 | Screw |
| 18 | Screw |
| 19 | Screw |
| 20 | Bottom part |
| 21 | Leaf spring assembly |
| 22 | Spacer ring |
| 23 | Outer ring |
| 24 | Hole |
| 25 | Spring segment |
| 26 | Inner ring |
| 27 | Hole |
| 28 | Control device |
| 29 | Sensor |
| 30 | Vibration isolation system |
| 31 | Table |

What is claimed is:

1. A vibration isolation system comprising:
a plurality of vibration isolators arranged in the vibration isolation system to vibration isolate a load, wherein the vibration isolators comprise:
a pneumatic spring, wherein the pneumatic spring is connected with a head part via a flexible rod or a buckling pendulum, wherein the flexible rod or the buckling pendulum is coupled with a base part via at least one leaf spring effective only in a vertical direction, and wherein the at least one leaf spring comprises a plurality of spring segments connected in parallel, and wherein the at least one leaf spring comprises an inner ring connected to a piston and an outer ring connected to the base part.

2. The vibration isolation system as claimed in claim 1, wherein the pneumatic spring comprises the piston having an extension, wherein the flexible rod or the buckling pendulum is arranged in the extension, at least sections thereof.

3. The vibration isolation system as claimed in claim 2, wherein the extension protrudes into a working space of the piston.

4. The vibration isolation system as claimed in claim 3, wherein the flexible rod or the buckling pendulum protrudes into the working space over at least half the height of the working space.

5. The vibration isolation system as claimed in claim 1, wherein the at least one leaf spring is part of a leaf spring assembly.

6. The vibration isolation system as claimed in claim 5, wherein a plurality of leaf springs of the leaf spring assembly are spaced apart by spacer rings, wherein the plurality of leaf springs includes the at least one leaf spring.

7. The vibration isolation system as claimed in claim 1, wherein the vibration isolators have a natural frequency of more than 5 Hz in vertical or horizontal direction.

8. The vibration isolation system as claimed in claim 1, wherein the flexible rod or the buckling pendulum or the at least one leaf spring is exchangeable to adjust rigidity.

9. The vibration isolation system as claimed in claim 1, wherein the vibration isolation system has at least one sensor for detecting vibrations or a position of the load to be isolated or of a floor on which the vibration isolation system is arranged, and
a control device for a fluid supply of the pneumatic spring, which is connected to the sensor.

10. The vibration isolation system as claimed in claim 9, wherein the level of the load to be isolated is adjustable via the pneumatic spring.

* * * * *